United States Patent
Khakhalev et al.

(10) Patent No.: US 8,158,905 B2
(45) Date of Patent: *Apr. 17, 2012

(54) ARC WELDING INITIATION SYSTEM AND METHOD

(75) Inventors: Alexander D. Khakhalev, Troy, MI (US); Jay Hampton, Lenox, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1144 days.

This patent is subject to a terminal disclaimer.

(21) Appl. No.: 11/926,158

(22) Filed: Oct. 29, 2007

(65) Prior Publication Data

US 2009/0107959 A1    Apr. 30, 2009

(51) Int. Cl.
*B23K 9/173*    (2006.01)

(52) U.S. Cl. .................................. 219/137 R; 219/74

(58) Field of Classification Search ............ 219/74, 219/121.55, 137.2, 137.31, 137.7, 137.71, 219/137 R See application file for complete search history.

(56) References Cited

U.S. PATENT DOCUMENTS

| | | | | |
|---|---|---|---|---|
| 3,309,491 | A | * | 3/1967 | Jacobs .......................... 219/74 |
| 4,645,903 | A | * | 2/1987 | De Vito et al. ............. 219/137 R |
| 4,749,841 | A | * | 6/1988 | Galantino et al. ............. 219/74 |
| 4,857,692 | A | * | 8/1989 | Larson et al. .................. 219/74 |
| 4,902,866 | A | * | 2/1990 | Galantino ...................... 219/74 |
| 5,234,148 | A | * | 8/1993 | Stone et al. ..................... 228/8 |
| 6,087,626 | A | * | 7/2000 | Hutchison et al. ....... 219/130.21 |
| 2001/0025832 | A1 | * | 10/2001 | Nakamura et al. ............. 219/74 |
| 2004/0188403 | A1 | * | 9/2004 | Kuiper et al. .............. 219/130.5 |
| 2005/0061367 | A1 | * | 3/2005 | Barr et al. ...................... 137/93 |
| 2009/0065489 | A1 | * | 3/2009 | Duffy ........................ 219/137 R |
| 2009/0107960 | A1 | * | 4/2009 | Hampton ....................... 219/74 |

FOREIGN PATENT DOCUMENTS

| | | |
|---|---|---|
| EP | 1129808 A2 | 5/2001 |
| JP | 63157763 A * | 6/1988 |
| JP | 8229684 A | 9/1996 |
| JP | 10-6009 A * | 1/1998 |
| WO | WO-2007/029033 A * | 3/2007 |

OTHER PUBLICATIONS

Machine translation of Japan Patent document No. 10-6009, Sep. 2011.*

* cited by examiner

*Primary Examiner* — Geoffrey S Evans

(57) ABSTRACT

A method and apparatus for controlling arc shielding gas during an arc welding operation is disclosed. The method may include the steps of actuating a first valve connected to an arc initiation source of gas to selectively allow arc initiation gas to flow through a mixing chamber; initiating an arc; actuating a second valve connected to a primary shielding source of gas to selectively allow primary shielding gas to flow through the mixing chamber; actuating the first valve to reduce, if needed, the arc initiation gas flow from the arc initiation source of gas; and continuing with the arc welding operation. The arc welding operation may also include actuating the first valve to cause the arc welding operation to operate in a different metal transfer mode when it is desirable, or when the arc welding operation is nearing completion.

11 Claims, 2 Drawing Sheets

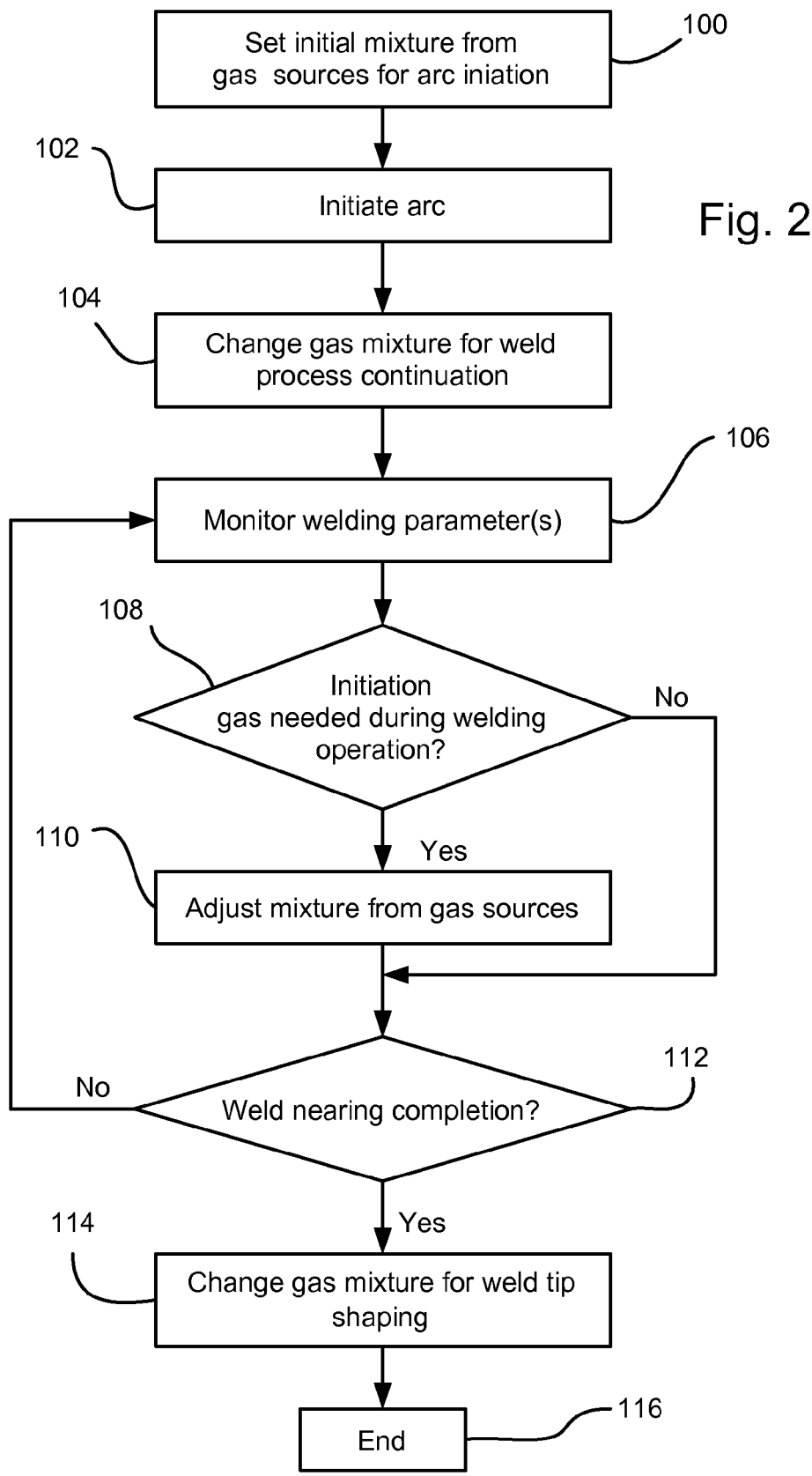

ARC WELDING INITIATION SYSTEM AND METHOD

BACKGROUND OF INVENTION

The present invention relates generally to arc welding applications.

Some arc welding systems employ a wire and shielding (welding) gas fed through a welding gun. The shielding gas is directed into the welding zone while an electric current is passed through the arc between the electrode and the workpiece. The shielding gasses are used to improve the characteristics of the arc and protect the molten pool from ambient air oxidation. Stability of the arc can be significantly affected by the type of shielding gasses used. As a result, specific mixtures of shielding gasses are commonly used to improve the weld quality. The gas mixtures are supplied in pre-mixed tanks or in bulk systems employing a gas mixer. In either case, the ratios of various gas components are fixed, and so are not adjustable during the welding process even though the amount of penetration, the spatter generation, and the physical appearance are some of the attributes affected by the shielding gas mixture selected. Moreover, instability of the arc at the start of the weld has a great affect on the entire weld since up to eighty percent of weld spatter may be generated at the time of arc start. Thus, proper initiation of the arc at the start of welding is important to the overall welding process and resulting quality of the weld.

Some have attempted to overcome arc initiation concerns by adjusting a wire approaching speed to a speed that allows for relatively reliable arc initiation to occur. But this requires highly responsive, repeatable wire feeding mechanisms, which are not always built into arc welding systems. If the wire feed for this technique is not smooth, it can cause arc initiation failure and excessive spatter generation. Another attempt to overcome arc initiation concerns uses an electronic control that senses wire contact with the workpiece, a quick reversal of the wire feeding motor, and an opening of the welding power supply circuit to ignite the arc. But this also requires a high level of wire feed control, and requires that one be able to sense the instant of wire contact with the workpiece. Others have attempted to improve arc initiation by creating a conical shaped wire tip at the end of the previous weld operation through techniques that involve programmable wire retraction from the pool or applying high voltage at the end of the welding cycle. But these methods require special operations that are not present in many arc welding systems.

SUMMARY OF INVENTION

An embodiment contemplates an arc welding and weld initiation system for an arc welding apparatus. The system may comprise a shielding gas supply and a control assembly. The shielding gas supply may include an arc initiation source of gas having a first gas mixture, a primary shielding source of gas having a second gas mixture that is different than the first gas mixture, a mixing chamber, a first automatically controllable valve selectively connecting the arc initiation source of gas to the mixing chamber, a second automatically controllable valve selectively connecting the primary shielding source of gas to the mixing chamber, and a shielding gas supply line configured to direct gas from the mixing chamber to a weld gun. The control assembly may includes a controller operatively engaging the first and second automatically controllable valves to control the actuation of the first and second automatically controllable valves.

An embodiment contemplates a method of controlling arc shielding gas during an arc welding operation, the method comprising the steps of: actuating a first valve connected to an arc initiation source of gas to selectively allow arc initiation gas to flow from the arc initiation source of gas through a mixing chamber and a weld gun; initiating an arc; after arc initiation, actuating a second valve connected to a primary shielding source of gas to selectively allow primary shielding gas to flow from the primary shielding source of gas through the mixing chamber and the weld gun; after arc initiation, actuating the first valve to reduce the arc initiation gas flow from the arc initiation source of gas; and after actuating the second valve, continuing with the arc welding operation.

An embodiment contemplates a method of controlling arc shielding gas during an arc welding operation, the method comprising the steps of: initiating an arc welding operation; after initiation, actuating a primary valve connected to a primary shielding source of gas to selectively allow primary shielding gas to flow from the primary shielding source of gas through a mixing chamber and a weld gun; after actuating the primary valve, determining if the arc welding operation is nearing completion; and if the arc welding operation is nearing completion, actuating an arc initiation valve connected to an arc initiation source of gas to allow arc initiation gas to flow from the arc initiation source of gas through the mixing chamber and the weld gun in order to cause the arc welding operation to operate in a spray transfer welding mode, thereby resulting in a conical shaped wire tip.

An advantage of an embodiment is that, by controlling the gas mixture in real time in relation to arc initiation and at the end of the welding cycle, a high reliability of arc initiation will be achieved. With improved arc initiation, the amount of spatter is reduced, resulting in improved weld quality.

An advantage of an embodiment is that on-demand weld mode control is achieved, allowing a switch to and from a spray mode. This facilitates joint configuration and helps control spatter. Also, control over the shape of the welding wire tip at the end of the welding cycle is achieved.

BRIEF DESCRIPTION OF DRAWINGS

FIG. 2 is a flow chart illustrating a process for providing reliable arc initiation for an arc welding process.

DETAILED DESCRIPTION

Figure 1:
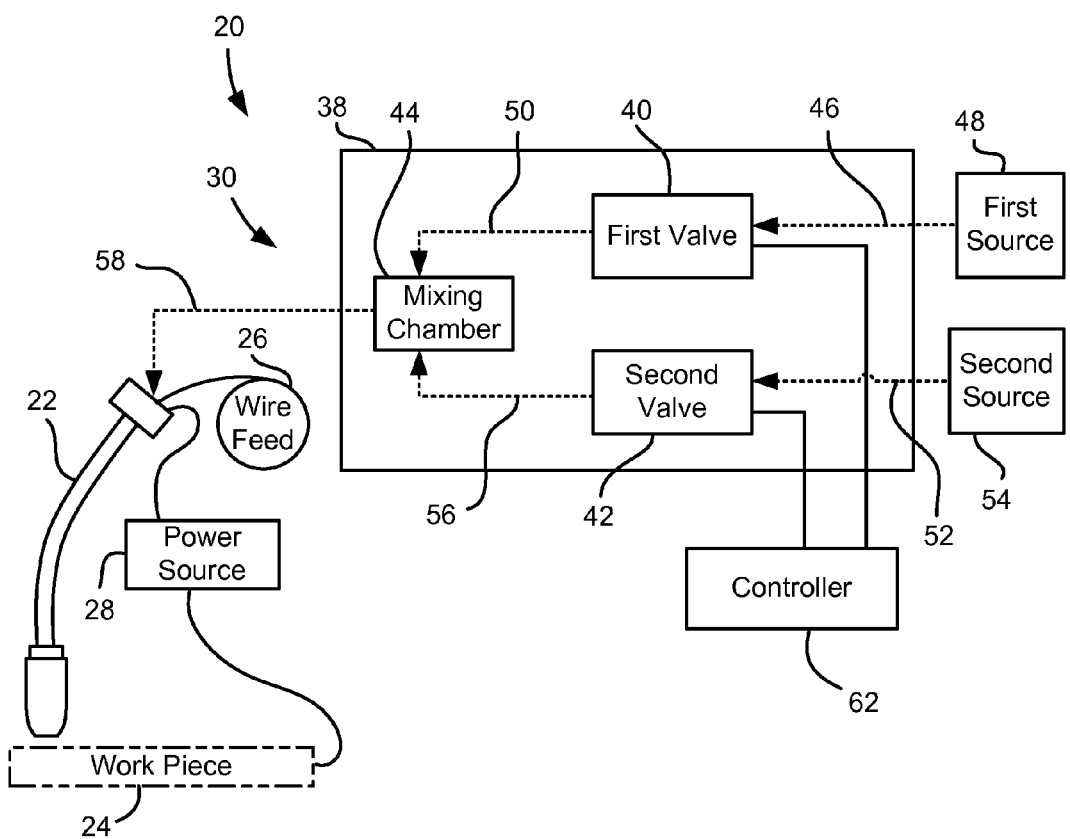
FIG. 1 is a schematic diagram of a portion of an arc welding system

Referring to FIG. 1, an arc welding apparatus, indicated generally at 20, is shown. The arc welding apparatus 20 includes a weld gun 22 that is employed to perform a welding process upon a workpiece 24, a wire feed unit 26, an electric power source 28, and a shielding gas supply assembly 30.

The gas supply assembly 30 has a gas control unit 38 that includes a first valve 40, a second valve 42 and a mixing chamber 44. The first and second valves 40, 42 may be servo valves or other suitable types of automatically controllable valves for controlling the flow of the shielding gasses. The first valve 40 connects to a gas input line 46 extending from a first source of gas 48 and an output line 50 leading to the mixing chamber 44. Gas lines are indicated in FIG. 1 by dashed lines. The second valve 42 connects to a gas input line 52 extending from a second source of gas 54 and an output line 56 leading to the mixing chamber 44. A shielding gas supply line 58 extends from the mixing chamber 44 to the weld gun 22.

The first and second sources of gas 48, 54, of course, can have different types or mixtures of various gases. The particular gas mixture is determined by the welding application and the composition of the workpiece material. The gases may be, for example, nitrogen, oxygen, argon, helium, carbon dioxide, hydrogen, or mixtures of these gases. For example, if carbon dioxide ($CO_2$) is employed as the primary shielding gas for the welding operation, then the arc initiation gas employed may be argon (Ar) since argon has a lower ionization potential. The lower ionization potential gas creates more favorable conditions for arc initiation. Thus, for a particular arc welding operation, the first source of gas 48 may be argon, which acts as an arc initiation gas, and the second source of gas 54 may be carbon dioxide, which acts as the primary shielding gas. Thus, actuating the first valve 40 provides initiation gas to the mixing chamber 44, and actuating the second valve 42 provides primary gas to the mixing chamber 44.

The arc welding apparatus 20 includes a controller 62, which may include an input/output (I/O) interface and timer. Alternatively, these may be separate devices. The controller 62 controls the actuation of the first and second valves 40, 42, thereby controlling the gas flow rate from and ratio between the first and second sources of gas 48, 54.

FIG. 2 is a flow chart of the arc initiation and welding process, which is applicable to the assembly of FIG. 1. An initial mixture from the gas sources 48, 54 for arc initiation is set, block 100. The controller 62 determines the desired mixture and amount needed from each source 48, 54 to obtain this mixture. For the example of gasses discussed above, the first valve 40 may be actuated so that the gas is essentially argon flowing into the weld gun 22 from the gas control unit 38. The welding process is started by initiating the arc, block 102. The gases mix in the mixing chamber 44 and are directed through the shielding gas supply line 58 into the weld gun 22. Also, the power source 28 and wire feed unit 26 are activated. After a predetermined parameter has been met where a sustainable arc is presumed to have been established, the controller 62 actuates the valves 40, 42 to obtain the appropriate amount of gas from each source 48, 54 for continuing the welding process, block 104. The parameter may be, for example, a predetermined amount of time. The valves 40, 42 may be actuated so that the first valve is closed (or almost completely closed, or even stays open if it is desired for the particular weld) and the second valve 42 is opened. For the above example, then, after argon is used for arc initiation, carbon dioxide from the second source 54 is used as the primary shielding gas during the welding operation.

During welding, a particular welding parameter or parameters may be monitored if so desired, step 106. If monitored, and arc initiation gas is found to be needed, block 108, then the controller 62 may adjust the mixture from the gas sources 48, 54, block 110. If the weld is not nearing completion, block 112, then the welding process continues. If the weld is nearing completion, then the gas mixture is changed to cause weld tip shaping, block 114, and the welding process ends, block 116. The weld tip shaping occurs by increasing the arc initiation gas (such as argon or other gas with a lower ionization potential than the primary gas) added to the gas mixture, which changes the welding mode from a short-circuit or globular transfer type of welding mode to a spray transfer welding mode. While a short-circuit or globular type of welding mode tends to produce a wire tip that is the shape of a ball, the spray mode tends to produce a wire tip that is shaped like a cone. A ball shaped wire tip makes arc initiation more difficult because of the larger and more inconsistent area engaging the work piece, which can result in arc initiation failure or excessive spatter. A conical shape, on the other hand, provides a consistent area of engagement with the workpiece and eases arc initiation by creating the desired current density during arc initiation and having a quick transition to thermoionic emission of electrons from the wire tip.

While certain embodiments of the present invention have been described in detail, those familiar with the art to which this invention relates will recognize various alternative designs and embodiments for practicing the invention as defined by the following claims.

What is claimed is:

1. A method of controlling arc shielding gas during an arc welding operation, the method comprising the steps of:
  (a) actuating a first valve connected to an arc initiation source of gas to selectively allow an arc initiation gas to flow from the arc initiation source of gas through a mixing chamber and a weld gun;
  (b) initiating an arc;
  (c) after step (b), actuating a second valve connected to a primary shielding source of gas to selectively allow a primary shielding gas to flow from the primary shielding source of gas through the mixing chamber and the weld gun;
  (d) after step (b), actuating the first valve to reduce the arc initiation gas flow from the arc initiation source of gas;
  (e) after step (c), continuing with the arc welding operation, monitoring weld parameters, and adjusting the flow from the arc initiation and primary shielding sources of gas when a determination is made that more of the arc initiation gas is required;
  (f) after step (e), determining when the arc welding operation is nearing completion; and
  (g) when the arc welding operation is nearing completion, actuating the first valve to cause the arc welding operation to operate in a spray transfer welding mode, thereby resulting in a conical shaped wire tip.

2. The method of claim 1 wherein step (a) is further defined by the arc initiation gas being argon.

3. The method of claim 1 wherein step (c) is further defined by the primary shielding gas being carbon dioxide.

4. The method of claim 1 wherein steps (a) and (c) are further defined by the arc initiation gas having a lower ionization potential than the primary shielding gas.

5. The method of claim 1 wherein step (b) is further defined by the arc being presumed initiated after a predetermined time period.

6. A method of controlling arc shielding gas during an arc welding operation, the method comprising the steps of:
  (a) initiating an arc welding operation;
  (b) after step (a), actuating a primary valve connected to a primary shielding source of gas to selectively allow a primary shielding gas to flow from the primary shielding source of gas through a mixing chamber and a weld gun;
  (c) after step (b), determining when the arc welding operation is nearing completion; and
  (d) when the arc welding operation is nearing completion, actuating an arc initiation valve connected to an arc initiation source of gas to allow an arc initiation gas to flow from the arc initiation source of gas through the mixing chamber and the weld gun in order to cause the arc welding operation to operate in a spray transfer welding mode, thereby resulting in a conical shaped wire tip.

7. The method of claim 6 wherein step (a) is further defined by:

actuating the arc initiation valve to allow the arc initiation gas to flow through the mixing chamber and the weld gun; and initiating an arc.

8. The method of claim 6 wherein step (d) is further defined by the arc initiation gas being argon.

9. The method of claim 6 wherein step (b) is further defined by the primary shielding gas being carbon dioxide.

10. The method of claim 6 wherein step (a) is further defined by the arc welding operation being presumed to be initiated after a predetermined time period.

11. The method of claim 6 wherein steps (b) and (d) are further defined by the arc initiation gas having a lower ionization potential than the primary shielding gas.

\* \* \* \* \*